Figure 23:
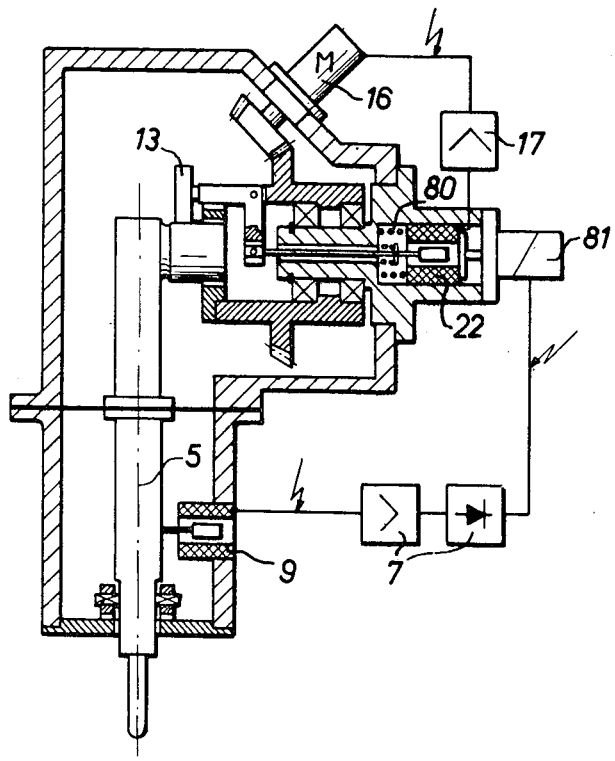

United States Patent

[11] 3,631,759

[72] Inventor Otto Ronner
 Rorchacherberg/SG, Switzerland
[21] Appl. No. 778,946
[22] Filed Nov. 26, 1968
[45] Patented Jan. 4, 1972
[73] Assignee Starrfrasmaschinen A.G.
 St. Gallen, Switzerland
[32] Priority Nov. 27, 1967
[33] Switzerland
[31] 16620/67

[54] AUTOMATIC TRACER ASSEMBLY FOR COPYING MACHINE TOOLS
 9 Claims, 28 Drawing Figs.
[52] U.S. Cl. .................................................... 90/62
[51] Int. Cl. .................................................... B23c 1/16
[50] Field of Search .......................................... 90/62, 13

[56] References Cited
UNITED STATES PATENTS
3,114,295 12/1963 Ronner et al. ................ 90/62

Primary Examiner—Gil Weidenfeld
Attorney—Fitch, Even, Tabin & Luedeka

ABSTRACT: The tracer assembly for copying machine tools comprises a tracer mounted intermediate its length in a housing by means of a diaphragm so as to be capable of oscillating in all directions and moving in axial direction, for tracing the pattern and controlling the feed movement of the machine tool. This tracer assembly comprises an automatic precontrol unit to impart to the tracer a contact pressure towards the pattern according to the direction of the contacting tangent between the pattern and the tracer tip and situated in the copying line plane. A feeling member is provided which is responsive to tracer deflections occurring outside of the copying line plane, and which is coupled with a correcting element acting against the precontrol unit.

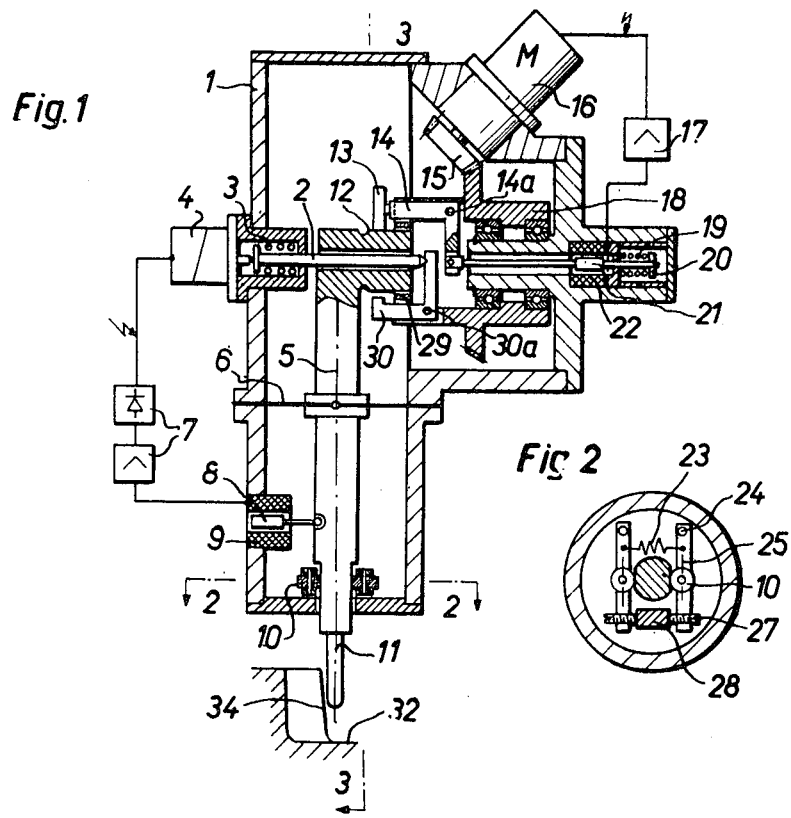
Fig. 1
Fig. 2
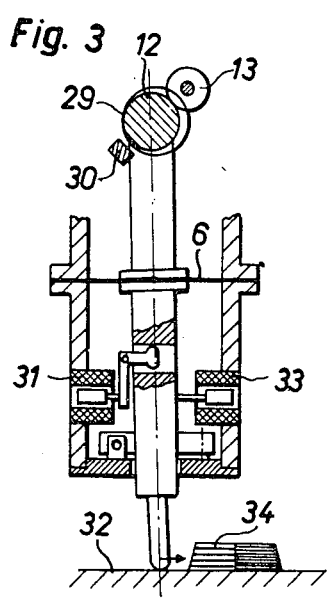
Fig. 3
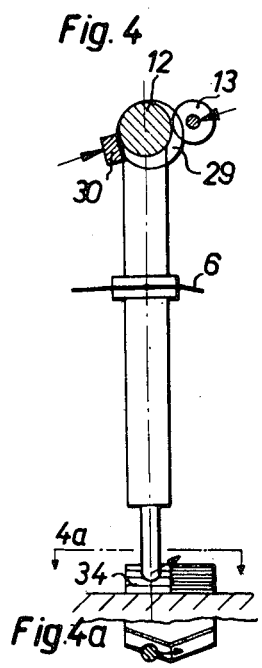
Fig. 4
Fig. 4a
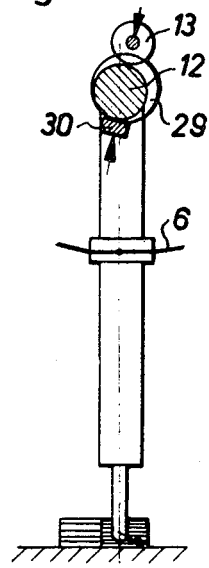
Fig. 5
INVENTOR.
OTTO RONNER

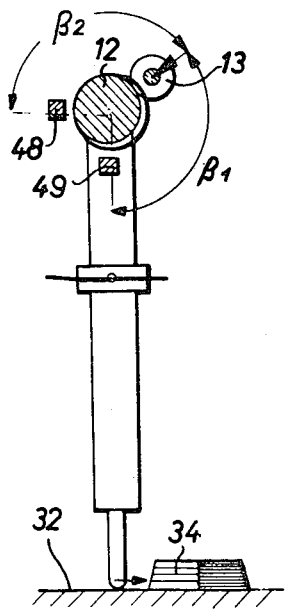
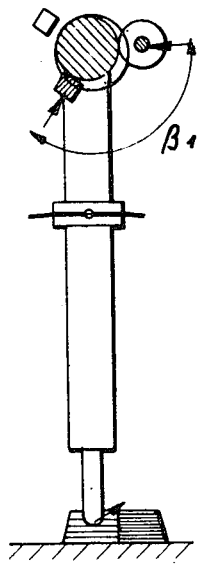
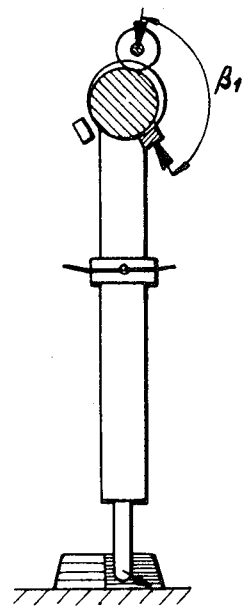
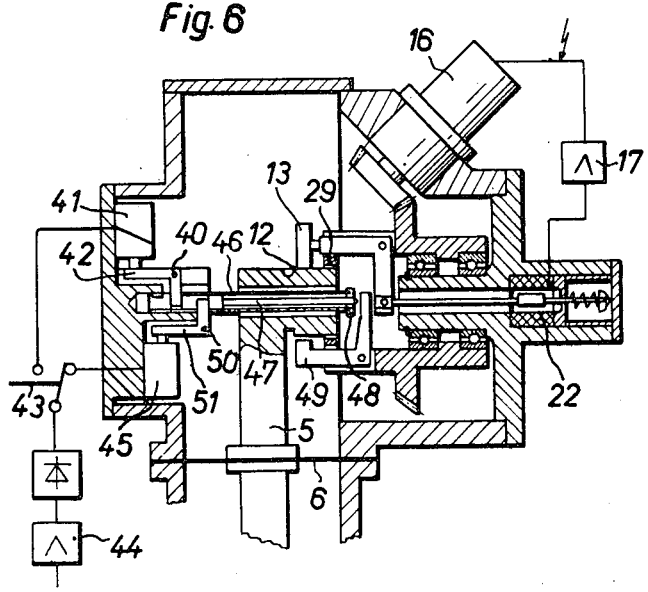
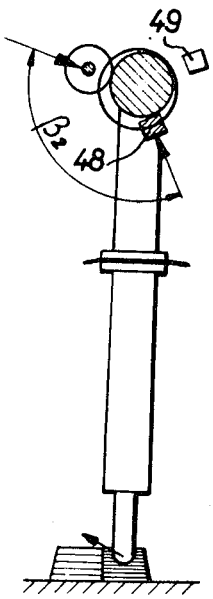

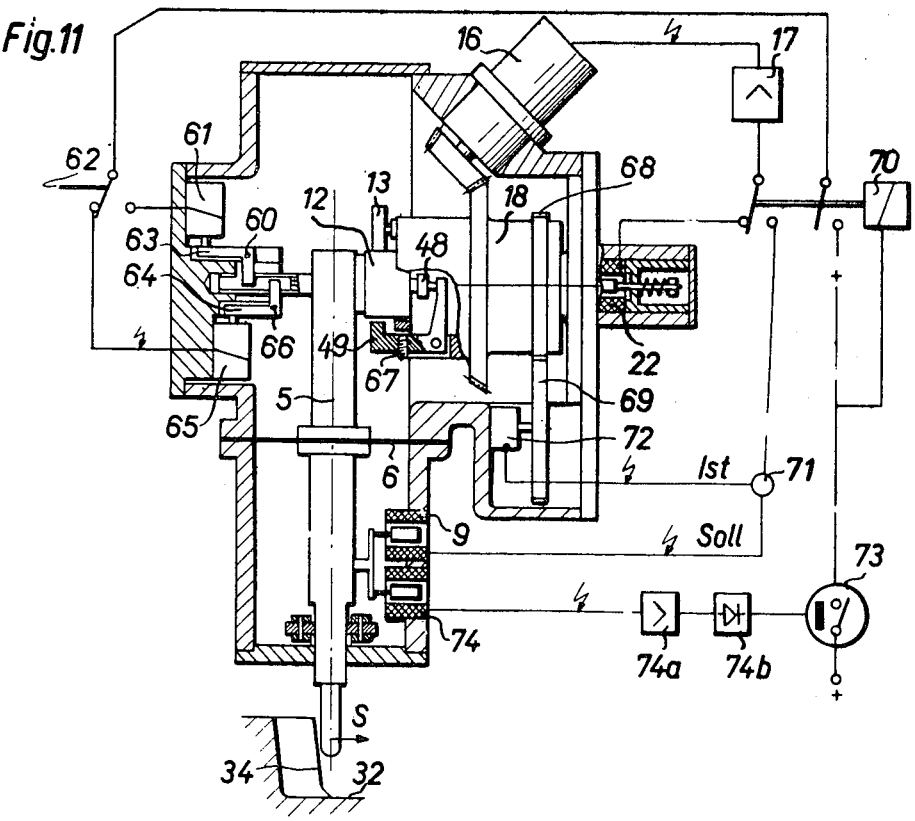
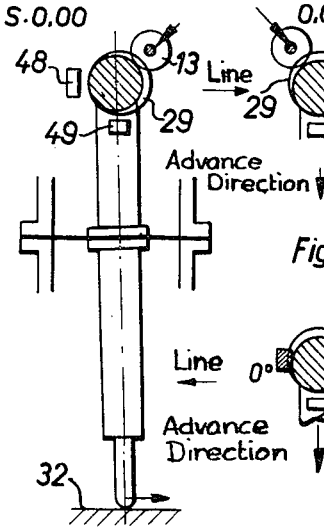
Fig.12 S.0.00
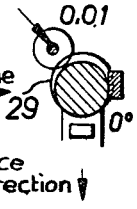
Fig.13 0.01
Fig.14 0.02
Fig.15 0.03
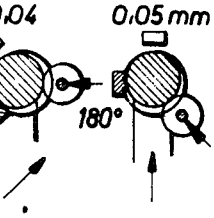
Fig.16 0.04   Fig.17 0.05 mm
Fig.18
Fig.19
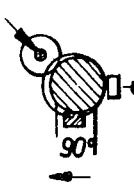
Fig.20
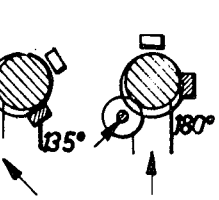
Fig.21   Fig.22
INVENTOR.
OTTO RONNER

INVENTOR.
OTTO RONNER

INVENTOR.
OTTO RONNER

AUTOMATIC TRACER ASSEMBLY FOR COPYING MACHINE TOOLS

The present invention relates to an automatic tracer assembly for a copying machine tool and having a tracer member arranged to be axially movable and mounted to effect a pivoting or wobbling motion, intended for tracing a pattern and for controlling the feed movement of the machine tool, and having an automatic precontrol unit acting on the tracer, in order to impart to said member, in dependence upon the direction of the contacting tangent between the pattern and the end of the tracer in the plane of the copying line, a precontrolling force lying in this plane and acting on the pattern.

Such as feeler or tracer is, for example, described in detail in U.S. Pat. No. 3,114,295.

In the majority of the known line copying systems, a feeler or tracer is provided which is deflectable in all directions from a central position. It is, therefore, possible also to copy surface sections on the pattern which are practically parallel to the copying line plane (called hereinafter sidewalls). The feeler or tracer deflection characteristic is thus elliptic, that is to say, when encountering an obstacle, greater deflections, e.g., 0.25 mm. and more, occur in the copying line plane rectangularly thereto (in the line step direction). In order to compensate for this characteristic which influences the accuracy of size of the machined workpiece, a feeler or tracer could basically be used whose section remains elliptic and whose end is formed as an ellipsoid. Since, however, a feeler or tracer of this type can hardly be produced economically, a round feeler or tracer is mostly used in practice and the sidewalls are machined after a first machining travel in a second travel with line direction turned through 90°.

In a further known copying system with forward motion of the tracer, the latter may, in the case of three-dimensional copying, only be deflected in the advance direction, i.e. in the copying line plane, but is locked in the line step direction. If and when such a tracer encounters a sidewall of the pattern which forms with the copying line plane an acute angle of only a few degrees, the tracer, before it is deflected in the copying line plane, is deformed in a plane, transverse thereto, with the result that too much material is removed from the workpiece which is, therefore, undersize. The danger of a deformation of the tracer in the case of these "sliding supports" which occurs relatively often between sidewall and copying line plane is thereby logically greater as the tracer is selected to be thinner. In this way, from a predetermined "degree of wedging" onwards, the result may be that the advance motion of of the tracer is mainly prevented.

It is an object of the present invention to provide an automatic tracer assembly of the type mentioned above wherein these disadvantages are minimized or substantially overcome.

In a tracer assembly according to the invention, a tracer member is provided, that responds to tracing deflections resulting outside the copying line plane, said member being coupled to a correcting element which acts against the precontrol unit.

Thus, in a tracer assembly according to the invention, all tracer deflections which have a component lying outside the copying line plane, are picked up by the said member and transferred to the correction element which, due to its effect directed against the precontrol unit, simulates to a certain extent the effect of a limiting shape which would only produce a tracing deflection lying in the copying line plane. The precontrol unit then reacts corresponding to this simulated limiting shape and changes the direction of the precontrolling force on the tracer until said feeler, apart from a response threshold, no longer has any deflection outside the copying line plane.

The proposed device consequently makes it possible to machine in one pass, dies and other three-dimensional shapes independently of their shape in the advance region usual for such shapes with a tracer diameter enlargement by 0.1 to 0.2 mm. independently of the advance motion, said dies being ready for use and true to size.

Figure 24:
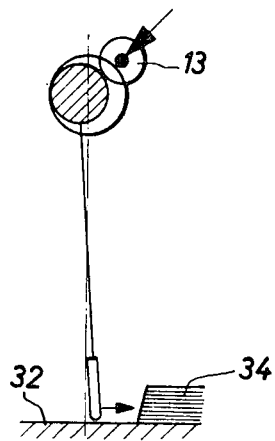
Figure 25:
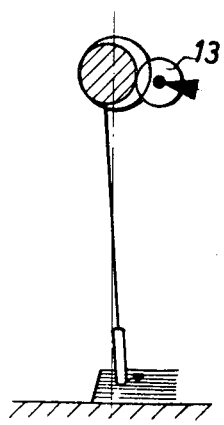
Figure 26:
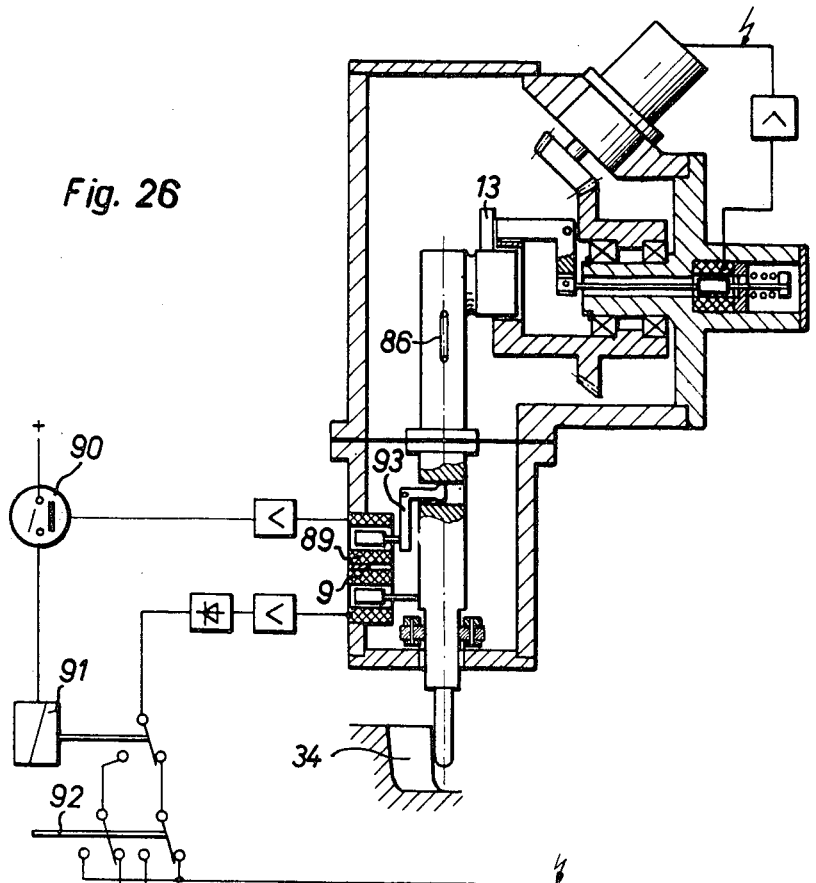
Figure 27:
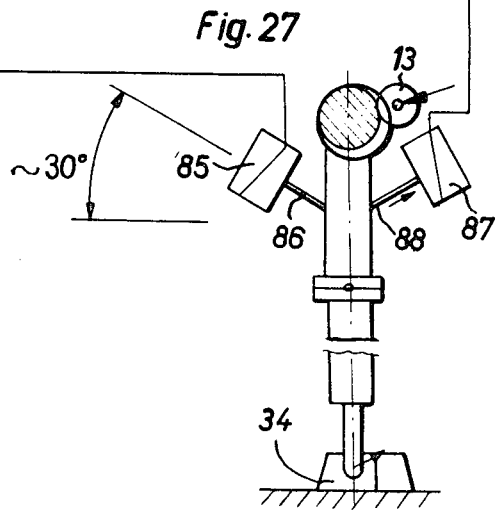
Figure 28:
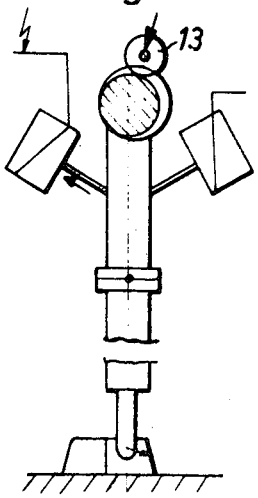

Some preferred embodiments of the invention will now be hereinafter more clearly explained, with reference to the accompanying drawings, in which:

FIG. 1 shows a first embodiment in schematic section in a plane vertical to the copying line plane, FIG. 2 shows a section along the line 2—2 of FIG. 1 at the level of the centering stops for the tracer member, FIGS. 3 to 5 show schematic views in the copying line plane with the omission of certain parts in order to explain the function, FIGS. 6 to 10 show a second embodiment with a correcting element having two correction members which may be switched on and off as desired, FIGS. 11 to 22 show a third embodiment in which the correcting element operates indirectly on the precontrol unit, FIG. 11 being a whole representation similar to FIG. 1 and FIGS. 12–22 being simplified views in order to explain the mode of operation of this embodiment, FIGS. 23 to 25 show a further embodiment similar to FIG. 1 wherein, however, the correcting element is drawn near the tracer in order to move the reference position of the transmitter controlling the precontrol unit itself, and FIGS. 26–28 show another embodiment wherein the correcting element takes the form of two solenoids which act directly on the tracer members.

Referring now to the drawings, as may be seen in FIGS. 1 to 5, a tracer member or pin 5 is suspended in the center of a housing 1, from a diaphragm 6. Said pin 5 and consequently a tracing element 11 inserted thereon are mounted to effect a pivoting or wobbling motion about a point located approximately at the level of the diaphragm 6, and these parts 5 and 11 are also axially movable. The pin 5 serves to transfer the scanned shapes of a pattern onto the workpiece machined by the tool. This transfer is effected by data converters which have only been shown schematically in FIG. 3 and are commonly designated by 31 and 33, and which in known manner control the copying movement in two coordinates between tool and workpiece. A more detailed description of these data converters 31, 33 is unnecessary since the connection between the tracer and the pattern belongs on the one hand to the tool and workbench but per se form no part of the invention; this connection may be hydraulic, electrohydraulic or completely electrical.

From the upper end of the pin 5, there projects a cylindrical pin 12 whose axis is at right angles both to the axis of the pin 5 and to the copying line plane. The cylindrical pin 12 engages in the limiting bore 29 of a precontrol unit 18 which may be rotated substantially coaxially with respect to the pin 12. There is pivotally mounted at 14a on this precontrol unit a cranked lever 14, on one arm of which is rotatably mounted a roller 13 which presses against the pin 12 under the effect of a compression spring 19 pressing on the other arm of the cranked lever 14 via a coupling and which attempts to press said pin 12 into an eccentric position with respect to the limiting bore.

The coupling which has just been described has a core 21 of an inductive data converter indicated at 22 which for its part operates, via an amplifier 17, a servomotor 16 which rotates the precontrol unit (parts 13, 14 18) via a pinion 15 as long as the data transmitter 22 establishes a position of the roller 13 (and consequently of the pin 12 in the limiting bore 29) deviating from a predetermined position. The mutual cooperation of the precontrol unit and tracer is explained in great detail in the above mentioned U.S. Pat. No. 3,114,295, so that here no indication need be made thereto.

It is only adjusted so much that the position of the roller 13 and consequently the direction of the precontrol force exerted on the pin 5 is independent upon the tracer deflection in the copying line plane, i.e., in practice, upon the contacting tangent lying in this plane between element 11 and the pattern.

The pin 5 is resiliently centered in the copying line plane. To this end, two levers 25 each pivotably about an axis 24 are provided on the lower closure flange (not shown) of the housing 1, which levers are urged towards each other by a tension spring 23 onto a stop 28 which is secured to the closure flange. Adjusting screws 27 are screwed to the free ends of the levers 25, and about half way along, the levers carry rollers 10, which lie on flattened sections of the pin 5. The adjusting screws 27 are thereby set so that the pin 5 in the copying line plane moves easily and without clearance between the levers 25, and can only be deflected out of this plane against the effect of the spring 23.

As FIG. 1 shows, the pin 5 is coupled to an inductive data converter 9 in the form of an electromechanical transducer having a core 8 fastened to the tracer member pin 5 to cover the movements of the pin outside the copying line plane. The date converter 9 produces a signal dependent upon the position of its core 8 which signal is fed to an electromagnet 4 via an amplifier and rectifier circuit 7 which has only been shown schematically here. This electromagnet 4 is of the type which produces a force proportional to the feed voltage and remaining constant over the working stroke. The armature of this magnet 4 acts on one end of a pin 2 which is biassed by means of a spring 3 and which passes through an axial bore (not shown) within the pin 12, and the other end of which acts on an arm of a cranked lever 30 mounted to pivot at 30a on the precontrol member 18. As indicated in FIG. 1, the swivel axis 30a of the cranked lever 30 is parallel to the swivel axis 14a of the cranked lever 14 and the other arm of the cranked lever 30 lies diametrically opposite the roller 13 with respect to the pin 12.

The mode of operation of the arrangement illustrated in FIGS. 1 to 5, may be outlined as follows. The copying movement in the copying line plane occurs in the manner described in the above-mentioned U.S. patent.

If the pin 5 is pivoted, during the tracing of a line, by a sidewall 34 (FIGS. 1,3) against the force of the spring 23 (FIG. 2) from the copying line plane, the cranked lever 30 is actuated by the magnet 4 in dependence upon the signal produced by the data converter 9 which is proportional to the amount of "lateral" deflection of the pin 5. The cranked lever 30 acts against the roller 13 via the cylindrical pin 12 in the same manner as if the pin 5 would experience a deflection in the copying line plane directly by the pattern, and thus slows down motion and causes the precontrol unit to rotate in a clockwise direction (FIG. 4) whereby the direction of the precontrol force acting on the pin 5 also changes. If the lateral displacement of the tracer member persists, the precontrol unit (and consequently the direction of the precontrol force) is rotated further until the tracer pin (for removing the lateral deflection) is raised out of the pattern threshold value. The same procedure occurs if the element 11 of the pin 5 is pivoted in opposite direction from the copying line plane. As soon as the deflection of the pin 5 from the copying line plane decreases (whether due to too much correction of the cranked lever 30 or due to a decreasing steepness of the sidewall), the process occurs in reverse direction, i.e., the tracer, having been increased again by the precontrol force, is pressed onto the pattern as indicated in FIG. 5.

FIGS. 6 to 10 illustrate an embodiment similar to that in FIGS. 1 to 5. Therefore, in order to simplify the representation, some of the figures for components common to both embodiments have been omitted. FIG. 6 shows the upper part of the pin 5 suspended from the diaphragm 6 with its cylindrical pin 12 which engages in the limiting bore 29 of the precontrol unit, and on which the roller 13 of this unit acts.

In this embodiment, the correcting element is divided into two corrector members, each of which may be switched on and off by means of a reversing switch 43 in dependence upon the direction of course of the lines. Each of these corrector members has its own cranked lever 48 or 49.

The free arms of these cranked levers 48 and 49 are not arranged diametrically opposite the roller 13 with respect to the pin 12 but are rotated through an obtuse angle $\beta_2$ or $\beta_1$, about 135° in the present case, so that the two ends of the cranked lever make a sector angle of about 90° with respect to one another and with respect to the axis of the pin 12. Each of the cranked levers 48 and 49 has its own actuating members, the cranked lever 48 having a thrust jacket 46, a cranked lever 42 resiliently and pivotally mounted at 40 and a magnet 41 whose lifting force is independent of the travel and is proportional to the feed voltage, while the cranked lever 49 is provided with a push rod 47, a cranked lever 51 resiliently and pivotally mounted at 50 and a magnet 45 similar to the magnet 41.

According to the switched direction of travel of the lines (towards the right or left in FIGS. 7 to 10), either magnet 41 or 45 is preselected by reversing switch 43 for activating the connecting members. In a movement towards the right, according to FIGS. 7 and 9, it is the magnet 45 actuating the cranked lever 49. The position of this cranked lever corresponds in steady-state angular position of the precontrol roller 13, to the position of the tangent on the traced pattern contour 32. This means that the cranked lever 49 may simulate a pattern contour lying in the copying line plane according to the actuation by the magnet 45.

If the tracer is deflected by the sidewall 34 of right angles to the plane of the drawing of FIG. 7, the cranked lever 49 lifts the pin 5 on the pin 12, thereby effects an upward advance movement as well as a reduction of the horizontal advance components, but simultaneously effects an outward pressure of the precontrol roller 13 which causes the precontrol to rotate in clockwise direction (FIG. 8). Lying on the cranked lever, the pin 5 is precontrolled upwardly to an increasing extent by the rotating precontrol unit until that position of rotation is found (FIG. 8) in which the tracer is so deflected in the line plane that the advance motion is effected in the direction adapted to the sidewall. Each successive forward or return of the sidewall produces an increase or decrease in the tracer side deflection and consequently a change in the amount of engagement of the cranked lever, and thereby a correction of the position of rotation of the precontrol unit in the clockwise or anticlockwise direction until balance is again found (FIG. 9).

Should the line direction be turned, a pivoting of about 90° in an anticlockwise direction is given to the precontrol unit in order that it assumes the position according to FIG. 10, as described in U.S. Pat. specification, No. 3,114,295 mentioned above. Meanwhile, the transmitter 9 is switched by the reversing switch 43 from magnet 45 to magnet 41 so that now the cranked lever 48 takes over the work of the cranked lever 49.

FIGS. 11 to 22 schematically show a further embodiment and its function. In this embodiment, the construction is basically the same as in the embodiment according to FIG. 6, so that the construction according to FIG. 11 will be referred to only shortly.

The electromagnets 61 and 65 are normal operating magnets which may be switched on and off by the reversing switch 62 in dependence upon the advance direction. The swivel axes 60 or 66 for the cranks 63 or 64 are fixed swivel pins in contrast to the resilient swivel pins 40 or 50 (FIG. 6). The two cranks 48, 49 acting on the cylindrical pin 12 of the pin 5 are provided on their ends lying opposite the pin 12 with adjusting screws 67 which are so adjusted that when the cranked levers are operated, the pin 12 is pushed only to the exact center of the limiting bore 29 (compare FIGS. 12, 13). The precontrol member 18 is provided with a gear rim 68 rotating the whole precontrol unit with it, which is coupled via a gear wheel 69 of the same dimensions, to a potentiometer 72. The momentary adjustment of the potentiometer is consequently characteristic for the momentary arrangement of the precontrol unit and accordingly gives the potentiometer which is connected to a reference voltage source (not shown) a signal corresponding to the momentary position of the precontrol unit on the lead designated by "1st".

The servomotor 16 of the precontrol unit may, as shown in FIG. 11, either by actuated as in FIGS. 1 and 6, by an inductive data converter 22 via amplifiers 17 or by the signal produced by a comparison switch 71 which is also fed via the amplifier 17. The reversal from one to the other control is effected by a reversing switch relay 70. The comparison circuit 71 serves to compare the signal fed from the transmitter 9 via the lead designated by "Soll" with that of the potentiometer. Parallel to the data converter 9 and coupled in the same manner to the pin 5 there is provided a further data transmitter 74 which controls, via an amplifier 74a and a rectifier 74b, a threshold value switch 73 which for its part lies in the energizing circuit of the relay 70. In this way, the adjustment of the elements 73, 74, 74a and 74b is such that the switch 73 closes as soon as the side deflection of the feeler tip on the pattern exceeds a predetermined value of, for example, 0.01 mm.

This embodiment is accordingly controlled so that the position of rotation of the precontrol member 18, from a predetermined threshold value of the side deflection, no longer regulates the precontrol roller 13 but is regulated by the amount of side deflection.

FIGS. 12–22 schematically show the mode of operation of this embodiment. When the pattern contour 32 in the line plane is being copied (FIG. 12), the cranked levers 49 and 48 are out of engagement and have no influence. The rotation of the precontrol 18 is thereby regulated by the data converter 22. However, as soon as the tracer is deflected on a sidewall 34 in line step direction, relay 70 switches to precontrol "proportional to side deflection," each side deflection of the tracer between 0.01 and 0.05 mm. being allocated a determined position of rotation measured by the potentiometer 72 (FIGS. 13–22). At the same time, according to the line direction, the magnet 61 or 65 preselected by the reversing switch 62 is actuated which, via the correction members described with the aid of FIG. 6, brings the cranked lever 48 or 49 into engagement in the limiting bore 29 until it stops on the adjusting screw 67.

Clamped between cranked lever 48 or 49, precontrol roller 13 and limiting bore 29, the tracer pin 5 is precontrolled in a predetermined direction from which this same advance direction results. If this does not agree to the shape determined by the pattern, the side deflection reduces or enlarges. This results in a rotation of the precontrol which the tracer multiplies against the pattern or controls away from the pattern until balance is found by the correct position.

By changing the line advance direction, an angular momentum of about 90° is on the one hand given to the precontrol in the direction of the new theoretical position, or on he other hand, the precontrol is switched by the reversing switch 62 onto the other magnet 61, or 65, so that the other cranked lever shifted through 90° takes over the role of the previously active cranked lever.

A fourth embodiment is illustrated in FIGS. 23 to 25. As FIG. 23 shows, the construction of this embodiment is very similar to that of FIG. 1 with the exception of the correcting element. No correction cranked levers are provided to act against the roller 13 of the precontrol unit.

The data converter 9 is coupled via the amplfier-rectifier group 7 to a proportional solenoid 81 in such a manner that the action is independent of travel, which solenoid acts mechanically on the "stationary" part of the data converter 22 (in this case on the coil) of the precontrol unit, which to this end is movable, and, biassed by a spring 80, is mounted on the precontrol member. This data converter 22 controls the servomotor 16 of the precontrol unit, as before, via the amplifier 17.

The "correction effect" is brought about in this case by changing the reference position of the "stationary" part of the data converter 22 in the precontrol member, this change of the reference position being effected proportionally to the value of the side deflection of the feeler or tracer.

If the pin 5 is deflected by a sidewall 34 to the side when the line is started (FIG. 24), the magnet 81, due to the signal from the data converter 9, presses the coil of the data converter 22 inwardly against the spring 80. The position of rest of zero position of the precontrol is thereby changed. The precontrol subsequently attempts to reassume this position of rest by beginning to rotate in a clockwise direction (FIGS. 24, 25).

The downwardly rotating precontrol roller 13 thus pushes the feeler or tracer pin upwards. This movement lasts until the new advance direction necessary for tracing the side wall is assumed (FIG. 25). Each further pattern shape change increases or decreases the side deflection which effects a change of the precontrol — rest position in a clockwise or anticlockwise direction, so that the tracer is raised from the pattern or sunk into the pattern according to the lateral deflection.

Finally, in FIGS. 26 to 28, a fifth embodiment is shown, wherein the basic construction is with the exception of the correcting members, very similar to that of the embodiment according to FIG. 1 or according to FIG. 23.

Again no correction cranked levers are provided. In their place, the correcting members are represented by a pair of proportional solenoids 85 and 87 which are directly coupled to the tracer pin 5 via spring rods 86 or 88 (FIG. 27). These two solenoids work away from the pattern and their lifting direction forms an angle of about 60° to the longitudinal axis of the pin 5.

The actuation of the solenoids 85 or 87 is effected due to the amplified signal of the data transmitter 9. The reversal between solenoids 85 and 87 is effected in dependence of the line advance direction by the reversing switch 92, but also additionally in dependence upon the vertical position of the pin 5 by actuation of a relay 91 by means of a threshold value switch 90 based on the polarity of a further data converter 89 which is coupled to the pin 5 via a cranked lever 93.

If the tracer is laterally deflected when the sidewall 34 is encountered (FIG. 27) the data converter 9 is brought from its neutral position. Its signal proportional to the travel is amplified and fed to the proportional solenoid 87 which pulls the tracer with a travel, proportional to the lateral deflection, upwardly and obliquely against the force of the precontrol roller. In this way, the precontrol rotates in a clockwise direction and assists the unwedging of the tracer from the pattern. These movements are effected until a balanced state is established in which the pin 5 is so precontrolled under the effect of solenoid 87, precontrol roller 13 and pattern 34 that the advance direction follows with the pressure necessary for tracing the pattern. If the sidewall retreats so that a descending direction results, the solenoid 85 must prevent the tracer from wedging due to the roller action, instead of solenoid 87, by operating against this force. This requires a reversal at the moment of passage through zero of the vertical movement which is undertaken by the data transmitter 89 by means of threshold value switch 90 and relay 91.

Also in this phase, each increased lateral deflection produces an amplifcation of the magnetic pulling force which draws the tracer from the wedged state. Any reduction of the side deflection reduces the magnetic force so that the tracer and consequently the advance direction is controlled by the increased effect of the precontrol roller against the pattern.

While in all the above described embodiments purely electrical, electromechanical and electronic switching elements are used, for the sake of simplicity, it should be understood that it remains within the judgement of the man skilled in the art to replace one part or all these switching elements by corresponding hydraulic or mechanical control elements, according to the actual circumstances, in order, for example, to redesign or complete an existing feeler or tracer as described in FIG. 8 of U.S. Pat. specification No. 3,114,295 to form a device as described here.

I claim:

1. An automatic tracer assembly for a copying machine tool having a pattern, a tracer member adapted to coact with said pattern, means mounting said tracer member for pivotal movement and for axial movement, an automatic precontrol means exerting on said tracer member a precontrol force in a direction at a constant angle to the direction of a tangent at the point of contact between said tracer member and pattern in a copying line plane, wherein the improvement comprises detecting means responsive to lateral deflections of said tracer member outside of the copying line plane to produce a signal in accordance to said lateral deflections, amplifying means connected to said detecting means for amplifying said signal, and correcting means connected to said amplifying means and responsive to the signal supplied therefrom to move said tracer member as if the lateral deflection were in the copying line plane.

2. A tracer assembly as claimed in claim 11, wherein means resiliently bias said tracer member to a position centered in the line copying plane and said detecting means includes a data transmitter issuing a signal characterizing the amount of the tracer member deflections outside the line copying plane, said correcting means being actuated according to this signal as amplified by said amplifying means.

3. A tracer assembly as claimed in claim 1, wherein said correcting means acts directly on the said tracer member.

4. A tracer assembly as claimed in claim 1, wherein said precontrol means for controlled by a proportionally operating reversing switch, said precontrol means in turn being actuated in dependence of the tracer member deflection in the line copying plane, wherein the correcting means is coupled to said reversing switch, in order to alter its neutral position according to the tracer member deflection effected outside the line copying plane.

5. A tracer assembly as claimed in claim 3, wherein said correcting means comprises a pair of correcting members arranged symmetrically with respect to the direction of operation of said precontrol means, said correcting members being selectively operable depending upon the direction of travel along the copying line plane, said correcting members operating in directions forming an obtuse angle with the operating direction of the precontrol means.

6. A tracer assembly as claimed in claim 5, wherein said each correcting means includes at least one crank lever having one end operably connected to said detecting means and another end operably connected to said tracer member.

7. A tracer assembly as claimed in claim 2, wherein said date transmitter is an electromechanical converter and said correcting means includes proportional solenoids and a reversing switch, the latter movable to one position to connect said converter and one of said proportional solenoids, and to another position for a short time to connect both proportional solenoids to one another.

8. A tracer assembly as claimed in claim 4, wherein a relay which is automatically reversible according to the direction of copying and operates said reversing switch with change in direction of copying.

9. A tracer assembly as claimed in claim 11, wherein a threshold value switch is provided between the said detecting means and said correcting means and a comparison switch is connected in series with said precontrol means, said comparison switch receiving inputs from on the one hand a data transmitter giving the momentary position of the precontrol means and on the other hand from said detecting means.

* * * * *

UNITED STATES PATENT OFFICE
CERTIFICATE OF CORRECTION

Patent No. 3,631,759          Dated January 4, 1972

Inventor(s) Otto Ronner

It is certified that error appears in the above-identified patent and that said Letters Patent are hereby corrected as shown below:

In column 1, line 14 change "as" to --a--; and in line 49 delete first "of". In column 2, line 70, change "independent" to --dependent--; and in line 74, change "pivotably" to --pivotable--. In column 3, line 14, change "date" to --data--. In column 4, line 11, change "activating" to --actuating--; in line 12, change "connecting" to --correcting--; and in line 73, change first "by" to --be--. In column 5, line 45, change "he" to --the--; and in line 72, change second "of" to --or--. In column 6, line 35, insert after precontrol --roller 13 is pressed outwardly, the precontrol--; and in line 41, insert after descending --advance--. In column 7, Claim 2, change "11" to --1--. In column 8, Claim 6, before the word correcting delete "each"; in Claim 7, change "date" to --data--; and in Claim 9, change "11" to --1--.

Signed and sealed this 18th day of July 1972.

(SEAL)
Attest:

EDWARD M. FLETCHER, JR.          ROBERT GOTTSCHALK
Attesting Officer                Commissioner of Patents